United States Patent [19]

Wright

[11] Patent Number: 5,033,910
[45] Date of Patent: Jul. 23, 1991

[54] MECHANICAL EXPANSION ANCHOR SHELL

[75] Inventor: Raymond L. Wright, Syracuse, N.Y.

[73] Assignee: The Eastern Company, Naugatuck, Conn.

[21] Appl. No.: 495,492

[22] Filed: Mar. 19, 1990

[51] Int. Cl.⁵ .............................................. E21D 20/02
[52] U.S. Cl. .................................... 405/261; 405/259; 411/57; 411/73
[58] Field of Search ........................ 405/259, 260, 261; 411/44, 57, 59, 71, 72, 73, 74

[56] References Cited

U.S. PATENT DOCUMENTS

| | | | |
|---|---|---|---|
| 4,360,301 | 11/1982 | Mosberger | 411/57 |
| 4,437,795 | 3/1984 | White | 405/259 |
| 4,764,055 | 8/1988 | Clark et al. | 405/261 |
| 4,806,053 | 2/1989 | Herb | 405/259 X |

FOREIGN PATENT DOCUMENTS

| | | | |
|---|---|---|---|
| 1535137 | 6/1968 | France | 411/72 |
| 480551 | 12/1969 | Switzerland | 411/73 |
| 1182227 | 2/1970 | United Kingdom | 411/72 |

Primary Examiner—David H. Corbin
Attorney, Agent, or Firm—Charles S. McGuire

[57] ABSTRACT

An improved, radially expansible shell for use in a mechanical expansion anchor and an anchoring system including such a shell in combination with a resin grouting mix, in a drill hole of predetermined diameter. The shell includes a plurality of leaf portions having internal surfaces for engagement by a tapered camming plug as the shell is expanded, external surfaces having a maximum diameter less than that of the drill hole, and side edges. A row of tapered teeth extends outwardly from the external surface of each leaf along one of the side edges thereof. The distance from the central axis of the shell to the crests of the teeth is substantially equal to the radius of the drill hole. The teeth frictionally engage the drill hole wall to retard rotation of the shell and ensure the desired expansion. When the anchor is used with a conventional, two-compartment resin package, the resin components may flow around the shell into the annular space between the external surfaces of the leaves and the drill hole wall.

15 Claims, 2 Drawing Sheets

MECHANICAL EXPANSION ANCHOR SHELL

BACKGROUND OF THE INVENTION

The present invention relates to novel and improved mechanical expansion anchors of the type used in anchoring an elongated bolt in a blind drill hole such as a mine roof. Such anchors include a radially expansible shell and a tapered plug, the present invention being directed particularly to improvements in the shell portion of the anchor, providing especially useful properties when the anchor is used in combination with a resin grouting material.

One of the most commonly employed means of supporting and reinforcing rock structures in underground mining and other excavating operations is the mechanical expansion anchor. Over the course of many years a wide variety of such anchors has been developed, all having in common some type of expansible shell structure and a tapered plug or nut which is placed on the threaded end of a bolt and moved axially on the threads by rotation of the bolt to cause radially outward expansion of the shell into tightly gripping engagement with the wall of a blind drill hole in the rock structure. More recently, mechanical expansion anchors have been installed concurrently with a resin grouting material which is typically supplied in a two-compartment package. The resin package or cartridge is inserted into the drill hole in advance of the end of the bolt carrying the expansion anchor and is ruptured to release and permit mixing of the resin components as it is forced against the blind end of the hole by advance of the bolt. As the bolt is rotated to expand the anchor, the resin components are mixed and subsequently harden to reinforce the anchorage.

One type of expansion anchor designed particularly for use in combination with a dual compartment resin cartridge is shown and described in U.S. Pat. No. 4,764,055, the disclosure of which is incorporated herein by reference. The present invention will be described in the context of an expansion anchor having the same structure as that of the referenced patent, with the addition of improved features of the present invention; it will be understood, however that the improvements need not be incorporated in anchors having all specific features of that shown in the patent. Although it is desirable that the resin components flow around as well as through the expansion shell, it has hitherto been necessary to make the shell substantially equal in diameter to the drill hole in order to provide frictional engagement of the shell with the drill hole wall.

It is a principal object of the present invention to provide a mechanical expansion anchor having novel and improved features which cooperate to ensure that the desired expansion occurs and that resin grouting material is properly distributed about the anchor, and the bolt upon which it is carried, within a blind drill hole.

A further object is to provide a resin-reinforced mine roof bolt anchor having a radially expansible shell with novel and improved structure for frictionally engaging the wall of a blind drill hole while providing an annular space between the major external surface of the shell and the drill hole wall for distribution of the resin.

Another object is to provide a radially expansible shell for use with a tapered camming plug in a mechanical expansion anchor having novel means incorporated in the shell for ensuring that the desired expansion occurs upon rotation of a bolt threadedly engaged with the plug.

Other objects will in part be obvious and will in part appear hereinafter.

SUMMARY OF THE INVENTION

The expansion shell of the invention includes a plurality of leaves or fingers arranged symmetrically about a central axis and having a series of serrations on their outer surfaces for gripping engagement with the wall of a blind drill hole upon expansion of the shell. An internally threaded, tapered nut or camming plug is threadedly engaged with one end of an elongated bolt or rod, and moved axially on the bolt by rotation thereof to effect expansion of the shell in the usual manner. A conventional, dual compartment resin cartridge may be inserted into the drill hole ahead of the end of the bolt carrying the expansion anchor and is ruptured to release the two components of the grouting material as it is forced against the blind end of the drill hole by advance of the bolt.

The shell leaves are laterally separated from one another by open slots or spaces defined by axially extending side edges of adjacent leaves. In the disclosed embodiment, four leaves extend integrally from a ring-shaped base portion to free ends lying in a common plane, and the slots are of substantially constant width from the free ends of the leaves to the base portion. The outer surfaces of the leaves lie at a maximum distance from the central axis of the shell and from the drill hole in which it is utilized, which is less than the radius of the hole.

The improvement of the present invention resides in a plurality of teeth extending outwardly from the outer surface of each leaf. The teeth are preferably arranged in an axially extending row along one side edge of each leaf, the crests of the teeth extending outwardly, beyond the largest outside diameter of the shell other than in the area of the teeth. The radius of the shell from the central axis to the crests of the teeth is substantially equal to the radius of the drill hole in which the anchor is placed. Thus, the crests of the teeth will frictionally engage the wall of the drill hole and the outer surface of the shell will be spaced from the wall by a distance at least as great as the height of the teeth. The frictional engagement ensures that the shell will not rotate together with the bolt so that the desired expansion occurs. Also, when the anchor is used in conjunction with resin grouting material, the spacing of the outer surface of the shell from the drill hole wall permits the resin components to flow around the shell.

The foregoing and other features of the invention will be more readily understood and fully appreciated from the following detailed disclosure, taken in conjunction with the accompanying drawings, wherein:

DETAILED DESCRIPTION

Figure 1:
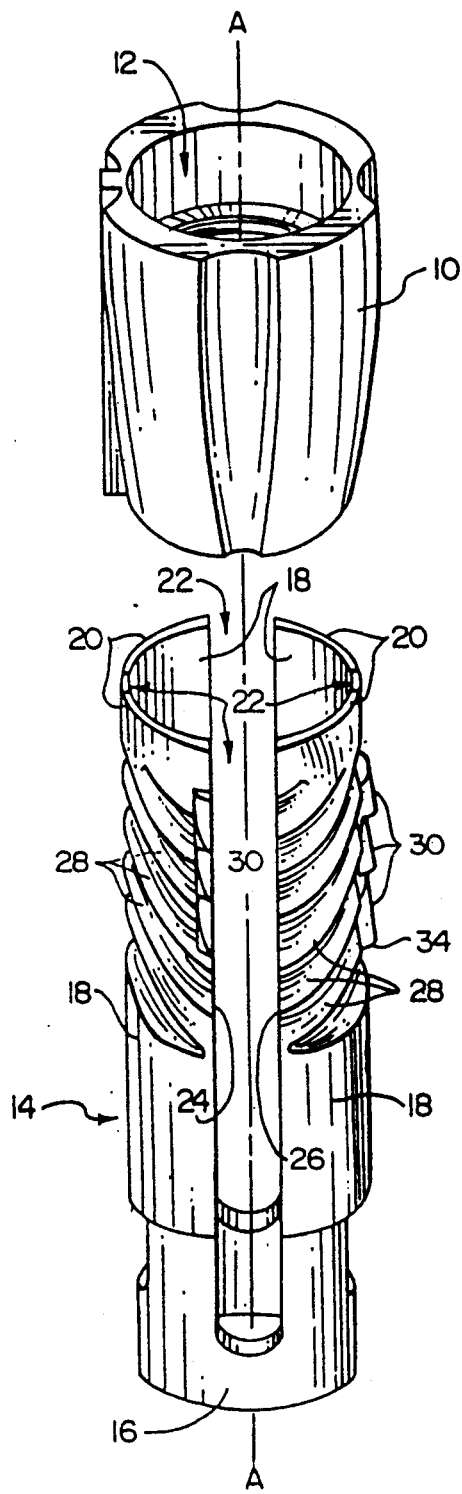
FIG. 1 is an exploded perspective view of the expansion shell of the invention and a tapered plug used in conjunction therewith.

Referring now to the drawings, the expansion anchor assembly includes tapered plug 10, having a central, internally threaded bore 12, and shell 14. The smaller end of plug 10 is placed in the upper end of shell 14 which has an inside diameter greater than the smaller end and less than the larger end of the plug. Thus, as plug 10 is moved axially into shell 14, the shell expands radially outwardly in well known manner. As far as the present invention is concerned, plug 10 is entirely conventional and may be of any configuration suitable to its function. The elements will be described as shown in the vertical orientation of FIGS. 4 and 5, with terms such as upper, lower, top bottom, etc., used for convenience and not in a limiting sense.

Shell 14 of the disclosed embodiment is a unitary element, normally a malleable iron casting, having a ring-like base portion 16 and four leaf portions 18 extending integrally from the base portion to free ends 20 lying in a common plane transverse to central axis A—A about which the plug and shell are symmetrically arranged. Leaf portions 18 are laterally spaced from one another by open slots 22 which extend from free ends 20 to base portion 16. In the illustrated form, slots 22 are of substantially constant width over their entire length, and lie between side edges 24 and 26 of each adjacent pair of leaves. A succession of stepped serrations 28 are formed on the outer surfaces of each of leaves 18 extending from free ends 20 for a portion of the axial lengths of the leaves.

Figure 2:
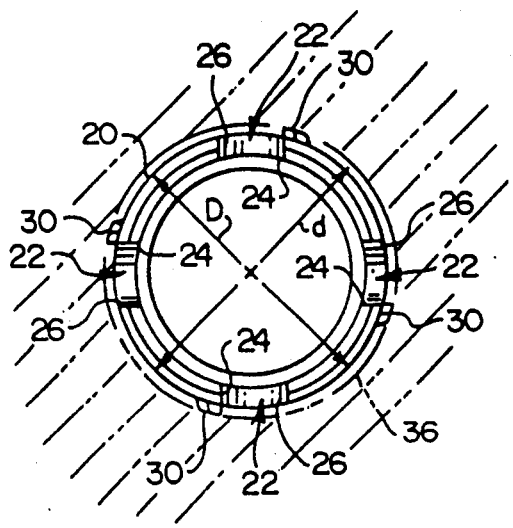
FIG. 2 is a top plan view of the shell of FIG. 1.
Figure 3:
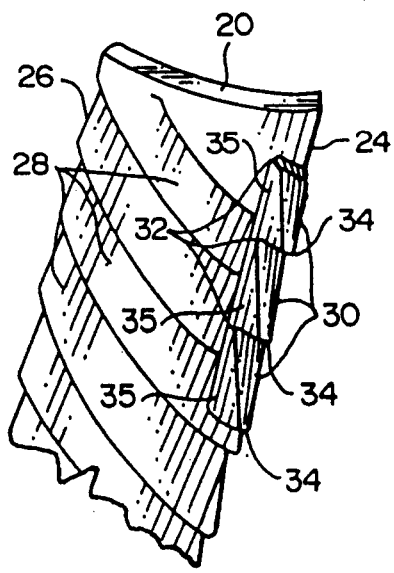
FIG. 3 is an enlarged, fragmentary, perspective view of a portion of the shell.

A series of teeth 30 extends outwardly in a vertical row along one side edge 24 of each of leaves 18. Teeth 30 are formed integrally with leaves 18. In the illustrated embodiment, three teeth 30 are formed along edge 24 of each leaf 18, each tooth tapering outwardly toward the lower end of shell 14 from a valley 32 to a crest 34. Valley 32 of each upper-most tooth 30 is closely adjacent, but spaced from, free end 20 of the leaf. The axial lengths of teeth 30, i.e., the distance from valley 32 to crest 34 along a line parallel to axis A—A, are preferably equal to one another, as are the heights of the teeth, i.e., the distance from valley to crest along a radial line. The lateral widths of teeth 30 are less than their axial lengths. While the corresponding axial lengths of serrations 28 are also equal to one another, the heights of the serrations increase from the upper to the lower serrations on each leaf, although this feature is not critical to the present invention. As best seen in the plan view of FIG. 3, one side of the row of teeth 30 is flat and flush with side edge 24 of each of leaves 18. The other side 35 (FIG. 2) tapers inwardly from the crests 34 of the teeth to the surface of serrations 28.

Shell 14 is, of course, dimensioned for use in a drill hole of predetermined diameter. Circle 36, shown in phantom lines in FIG. 3, indicates the circumference of a drill hole wherein the anchoring system of the invention is to be employed. Diameter D of the drill hole is substantially equal to the distance between crests 34 of teeth 30 on diametrically opposite sides of shell 14. Diameter d is the major (largest) external diameter of shell 14 in areas other than that of teeth 30.

Figure 4:
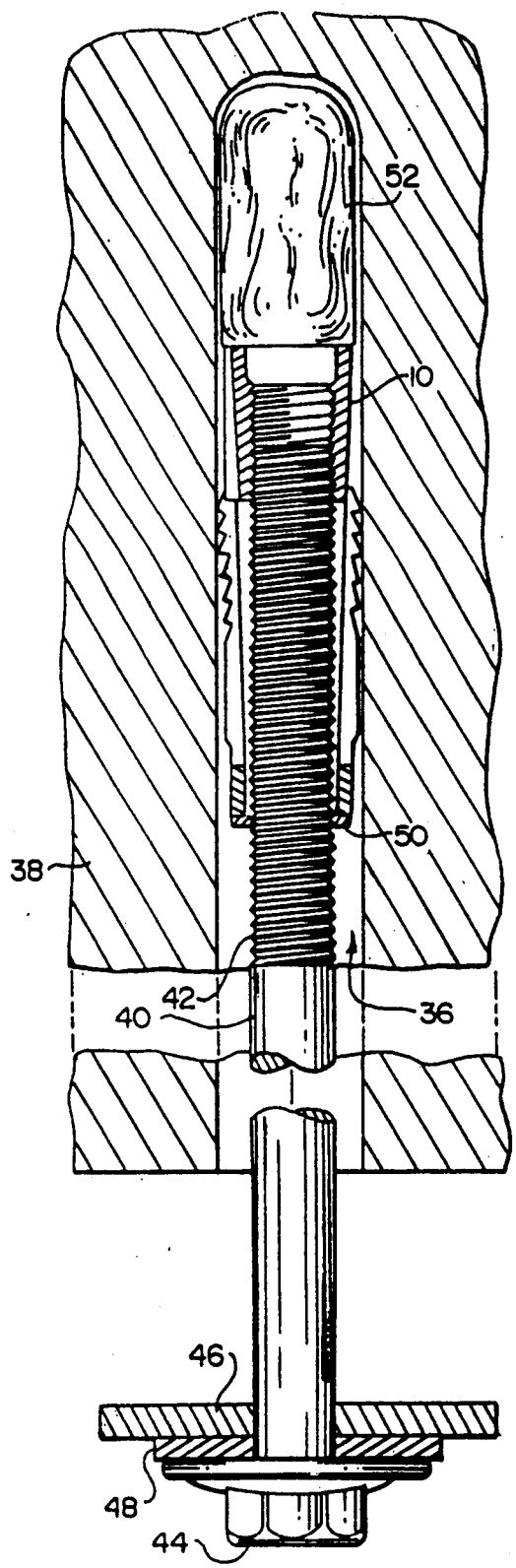
FIGS. 4 and 5 are elevational views in vertical section, showing the shell and plug of FIG. 1 on the end of a bolt as it is anchored in a blind drill hole, together with a conventional, dual compartment resin cartridge.
Figure 5:
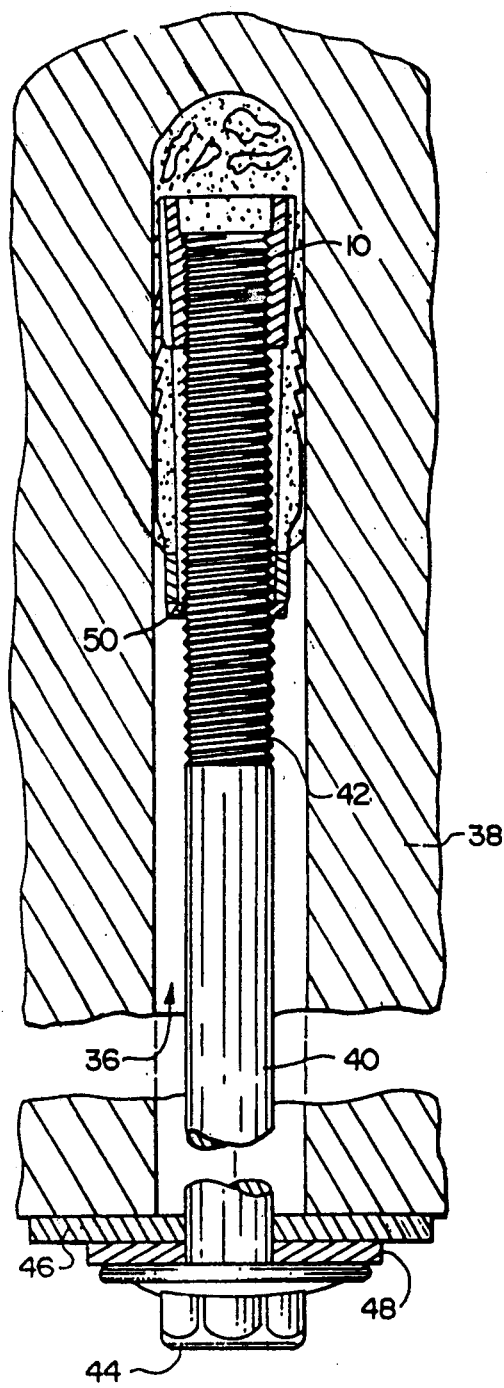

Referring now to FIGS. 4 and 5, the preferred method of installation of the expansion anchor will be described. Blind drill hole 36 of predetermined diameter is formed in rock structure 38, such as a mine roof, by conventional drilling techniques. Elongated bolt 40 has external threads 42 extending from one end thereof for a portion of its length and head 44 on the other end. Bolt 40 extends loosely through openings in support plate 46 and washer 48. Threads 42 are engaged within the internal threads of central bore 12 of plug 10. Shell 14 is supported on bolt 40 in conventional fashion, e.g., by support nut 50 with the smaller diameter, lower end of plug 10 positioned within the upper end of the shell, surrounded by the free ends of leaves 18.

Conventional, dual compartment resin cartridge 52 is inserted in drill hole 36, followed by the threaded end of bolt 40 with plug 10 and shell 14 carried thereon. Drill hole 36 is formed to a depth an inch or so greater than the length of bolt 40, whereby advance of the bolt until support plate 46 contacts the surface of rock structure 38 surrounding the open, lower end of the drill hole causes cartridge 52 to rupture and release its contents. The grouting mix components, initially separated within cartridge 52, comprise, e.g., a polyester resin and catalyst which are in a flowable condition until they are mixed together and subsequently harden.

Bolt 40 is then rotated by a power wrench engaged with head 44. As explained in connection with FIG. 3, crests 34 of teeth 30 frictionally engage the wall of drill hole 36, thereby retarding any tendency of shell 14 to rotate with the bolt. Thus, rotation of bolt 40 causes plug 10 to travel downwardly on threads 42, with the progressively larger diameter of the plug forcing leaves 18 to expand radially outward. The grouting components are mixed sufficiently to produce the necessary hardening thereof by the turbulence produced by forceful release of the components from the cartridge, by flowing around and through the mechanical anchor elements and around the bolt, and by rotation of the bolt to expand the shell. The components may flow into and through the annular space between the outer surfaces of leaves 18, and through slots into the area around bolt 40 and inside shell 14.

The components are shown in FIG. 5 in the fully installed condition. Plug 10 has traveled down threads 42 to a position causing outward expansion of leaves 18 into tightly gripping engagement with the wall of drill hole 36, both serrations 28 and teeth 30 biting into the rock structure. Teeth 30 provide frictional engagement of the anchor shell with the bore hole wall, thereby retarding shell rotation and ensuring expansion in the desired manner. At the same time, in installations wherein a resin cartridge is utilized, the difference in diameter between the outside of the shell and the drill hole provides an annular space for flow of resin mix components between the outer surfaces of the shell leaves and the drill hole wall. The result is an extremely reliable and effective bolt anchoring system.

What is claimed is:

1. A radially expansible shell for use with a tapered camming plug in a blind drill hole of predetermined diameter in a rock structure to anchor therein an elongated rod having an externally threaded end portion engaged with an internally threaded opening in said plug, said shell comprising:

a) a plurality of leaf portions each having external and internal surfaces, side edges and upper ends adapted to receive said plug therebetween, said leaf portions being symmetrically arranged about a central axis;

b) said external surfaces of said leaf portions including a plurality of stepped serrations on at least portions of said leaf portion external surfaces extending substantially the full width thereof, and in the unexpanded condition of said shell, having a maximum distance from said central axis less than one-half said predetermined diameter; and c) a group of teeth on each of said leaf portions extending outwardly from said external surface thereof, the teeth of each of said groups being vertically aligned along a lateral edge substantially coincident with one of said leaf portion side edges each of said teeth tapering outwardly away from said central axis from a valley to a crest spaced from said central axis by a distance substantially equal to one-half said predetermined diameter and having a predetermined axial length measured from said valley to said crest along a line parallel to said central axis.

2. The invention according to claim 1 wherein the lateral width of said teeth is less than said axial length.

3. The invention according to claim 1 wherein said crests on the teeth of each of said groups lying on a line parallel to said central axis.

4. The invention according to claim 3 wherein said valley of the upper-most tooth of each of said groups is closely adjacent said upper end of said leaf portion.

5. The invention according to claim 1 wherein the number of teeth in each of said groups is at least three.

6. The invention according to claim 1 wherein said axial length is the same for each of said teeth and is greater than the lateral width of said teeth.

7. The invention according to claim 6 wherein said teeth each include portions tapering inwardly toward said leaf external surface and away from said lateral edge.

8. A one-piece expansion shell for use with a tapered camming plug in a blind drill hole of predetermined diameter in a rock structure to anchor therein an elongated rod having an externally threaded end portion engaged with an internally threaded opening in said plug, said expansion shell comprising:

a) a ring-like base portion concentrically arranged about a central axis;

b) a plurality of leaf portions extending integrally from said base portion in a common direction and concentrically arranged about said central axis, each of said leaf portions having inner and outer surfaces, lateral side edges and free ends lying in a common plane perpendicular to said central axis;

c) said outer surfaces including a plurality of stepped serrations extending laterally thereof, said outer surfaces, including said serrations, lying substantially on a circle centered at said central axis in all planes perpendicular to said central axis, said circle having a maximum diameter in at least one of said planes which is less than said predetermined diameter;

d) a group of teeth on each of said leaf portions extending outwardly from said external surface thereof, each of said teeth having a crest lying on a line parallel to said central axis and spaced from said central axis by a distance substantially equal to one-half said predetermined diameter, the teeth of each of said groups being vertically aligned along a lateral edge substantially coincident with one of said leaf portion side edges.

9. The invention according to claim 8 wherein said valley of the upper-most tooth of each of said groups is closely adjacent said upper end of said leaf portion.

10. The invention according to claim 8 wherein the lateral width of said teeth is less than said axial length.

11. A combined resin-mechanical anchoring system for supporting and reinforcing a rock structure having formed therein a blind drill hole of predetermined diameter, said anchoring system comprising:

a) an elongated bolt having threads extending from one end for at least a portion of the length thereof;

b) a tapered camming plug having relatively larger and smaller ends and a central bore with internal threads for engagement with said bolt threads;

c) a radially expansible shell including a plurality of leaf portions each having internal and external surfaces and side edges, said side edges of adjacent leaves being separated by axially extending slots, said shell being substantially circular in cross section and symmetrically arranged about a central axis;

d) means for supporting said shell upon said one end of said bolt with said smaller end of said plug extending into said shell;

e) a two-compartment resin cartridge adapted for insertion into said drill hole in advance of said one end of said bolt with said plug and shell thereon, and for rupture of said cartridge by advance of said bolt to release the components thereof for mixing;

f) said external surfaces of said leaf portions including a plurality of stepped serrations on at least portions of said leaf portion external surfaces extending substantially the full width thereof, said external surfaces, including said serrations, in the unexpanded condition of said shell having a maximum distance from said central axis less than one-half said predetermined diameter; and g) at least one tooth on each of said leaf portions extending outwardly from said external surface thereof, each of said teeth having a crest spaced from said central axis by a distance substantially equal to one-half said predetermined diameter, whereby an annular space, into which said resin components may flow, is provided between said leaf portion external surfaces and the wall of said drill hole.

12. The invention according to claim 11 wherein the thickness of said annular space is between about 0.025" and 0.050".

13. The invention according to claim 11 wherein said teeth extend from said external surfaces in the area of said serrations.

14. The invention according to claim 13 wherein a group of said teeth extend outwardly from each of said leaf portions, said crests on the teeth of each of said groups lying on a line parallel to said central axis.

15. The invention according to claim 11 wherein said valley of the upper-most tooth of each of said groups is closely adjacent said upper end of said leaf portion.

* * * * *